US009189062B2

(12) United States Patent
Janefalkar et al.

(10) Patent No.: US 9,189,062 B2
(45) Date of Patent: Nov. 17, 2015

(54) PORTABLE ELECTRONIC DEVICE AND METHOD FOR CONTROLLING OPERATION THEREOF BASED ON USER MOTION

(75) Inventors: Tushar Janefalkar, Libertyville, IL (US); Amitkumar N. Balar, Mundelein, IL (US); Shakil Barkat, San Jose, CA (US); Sajid I. Dalvi, Aurora, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 13/414,585

(22) Filed: Mar. 7, 2012

(65) Prior Publication Data

US 2013/0234924 A1    Sep. 12, 2013

(51) Int. Cl.
*G06F 3/01* (2006.01)
*G06F 1/16* (2006.01)
(Continued)

(52) U.S. Cl.
CPC ............... *G06F 3/011* (2013.01); *G06F 1/163* (2013.01); *G06F 1/1694* (2013.01); *G06F 1/3206* (2013.01); *G06F 1/3265* (2013.01); *G06F 3/017* (2013.01); *G06F 3/0346* (2013.01); *H04M 1/72522* (2013.01); *H04W 52/027* (2013.01); *H04W 52/0251* (2013.01);
(Continued)

(58) Field of Classification Search
CPC ....... G06F 3/011; G06F 3/038; G06F 3/0338; G06F 3/0346; G06F 3/0236; G06F 1/656; G06F 1/163; G06F 1/1694; G06F 1/3206; G06F 3/017; G06F 1/3265; G06F 2200/1637; G06F 1/1626; H04M 1/72522; H04M 2250/12; H04M 1/05; H04W 52/0251; H04W 52/027; H04W 52/0254; H04B 2001/3861; Y02B 60/1242

USPC .......................................... 345/156, 474, 169
See application file for complete search history.

(56) References Cited

U.S. PATENT DOCUMENTS 7,306,567 B2    12/2007    Loree, IV
7,522,031 B2     4/2009    Lim
(Continued)

FOREIGN PATENT DOCUMENTS

WO    2006120211 A1    11/2006
WO    2008072168 A1     6/2008
(Continued)

OTHER PUBLICATIONS

Patent Cooperation Treaty, "PCT Search Report and Written Opinion of the International Searching Authority" for International Application No. PCT/US2013/024935 dated May 13, 2013, 11 pages.
(Continued)

*Primary Examiner* — Aneeta Yodichkas
(74) *Attorney, Agent, or Firm* — Shumaker & Sieffert, P.A.

(57) ABSTRACT

A portable electronic device includes a motion sensor and a controller. The motion sensor detects an alternating signature motion of a limb of the user about a virtual axis corresponding to the limb. The motion sensor may be an accelerometer capable of detecting three dimensional acceleration. The accelerometer detects acceleration along X, Y and/or Z axes, in which acceleration peaks of the X and Z axes alternate with each other and acceleration of the Y axis remains substantially steady relative to the X and Y axes. The portable electronic device controls at least one function based on the detected alternating signature motion of the limb and/or acceleration along the X, Y and/or Z axes.

15 Claims, 7 Drawing Sheets

(51) Int. Cl.
- *G06F 1/32* (2006.01)
- *H04W 52/02* (2009.01)
- *G06F 3/0346* (2013.01)
- *H04M 1/725* (2006.01)
- *H04M 1/05* (2006.01)
- *H04B 1/3827* (2015.01)

(52) U.S. Cl.
CPC .. *H04W 52/0254* (2013.01); *G06F 2200/1637* (2013.01); *H04B 2001/3861* (2013.01); *H04M 1/05* (2013.01); *H04M 2250/12* (2013.01); *Y02B 60/1242* (2013.01)

(56) References Cited

U.S. PATENT DOCUMENTS

| | | | |
|---|---|---|---|
| 8,075,499 | B2 | 12/2011 | Nathan et al. |
| 2003/0142065 | A1* | 7/2003 | Pahlavan ................. 345/156 |
| 2004/0214146 | A1 | 10/2004 | Harris et al. |
| 2008/0001770 | A1* | 1/2008 | Ito et al. .................. 340/669 |
| 2009/0164219 | A1* | 6/2009 | Yeung et al. ............. 704/258 |
| 2010/0033422 | A1 | 2/2010 | Mucignat et al. |
| 2010/0214243 | A1* | 8/2010 | Birnbaum et al. ........ 345/173 |
| 2011/0025901 | A1* | 2/2011 | Tsubusaki ............. 348/333.12 |
| 2011/0080339 | A1* | 4/2011 | Sun et al. ................ 345/157 |
| 2012/0016641 | A1 | 1/2012 | Raffa et al. |
| 2012/0069052 | A1* | 3/2012 | Lee et al. ................ 345/633 |
| 2012/0140451 | A1 | 6/2012 | Araujo et al. |
| 2013/0135203 | A1* | 5/2013 | Croughwell, III ........ 345/158 |

FOREIGN PATENT DOCUMENTS

| | | | |
|---|---|---|---|
| WO | WO2011034307 | * | 3/2011 |
| WO | 2011056657 A2 | | 5/2011 |
| WO | WO/2011/108372 | * | 9/2011 |

OTHER PUBLICATIONS

U.S. Appl. No. 13/358,951 to Alberth, et al., filed Jan. 26, 2012, titled Portable Electronic Device and Method for Controlling Operation Thereof Taking Into Account Which Limb Possesses the Electronic Device.

International Preliminary Report on Patentability of counterpart International Application No. PCT/US2013/024935, mailed Sep. 18, 2014, 9 pp.

Patent Examination Report No. 1 from counterpart Australian Patent Application No. 2013230800, issued Aug. 28, 2014, 3 pp.

Response to Examination Report for Australian Patent Application 2013230800, filed Oct. 15, 2014 18 pp.

First Office Action from counterpart Chinese Application No. 201380012883.1, dated Jun. 3, 2015, 21 pp.

* cited by examiner

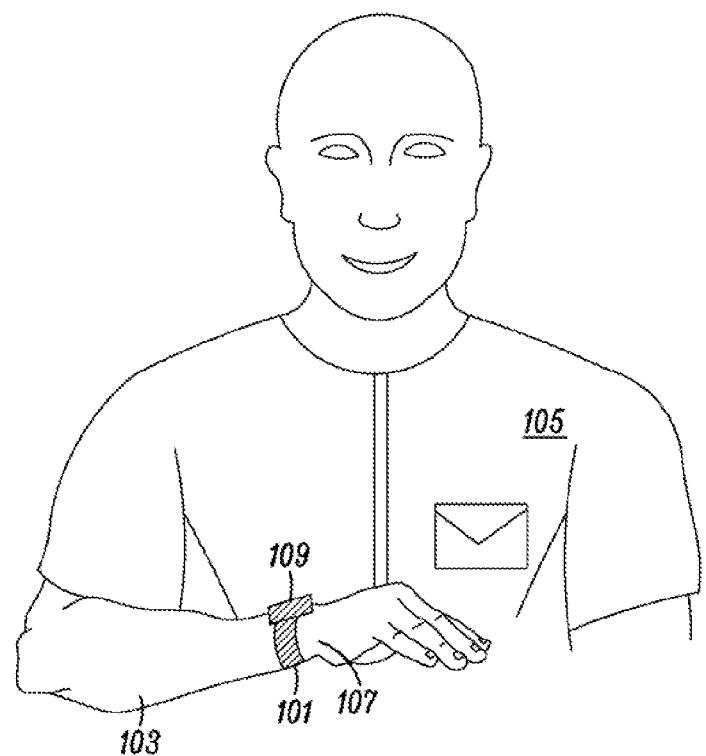
FIG. 1
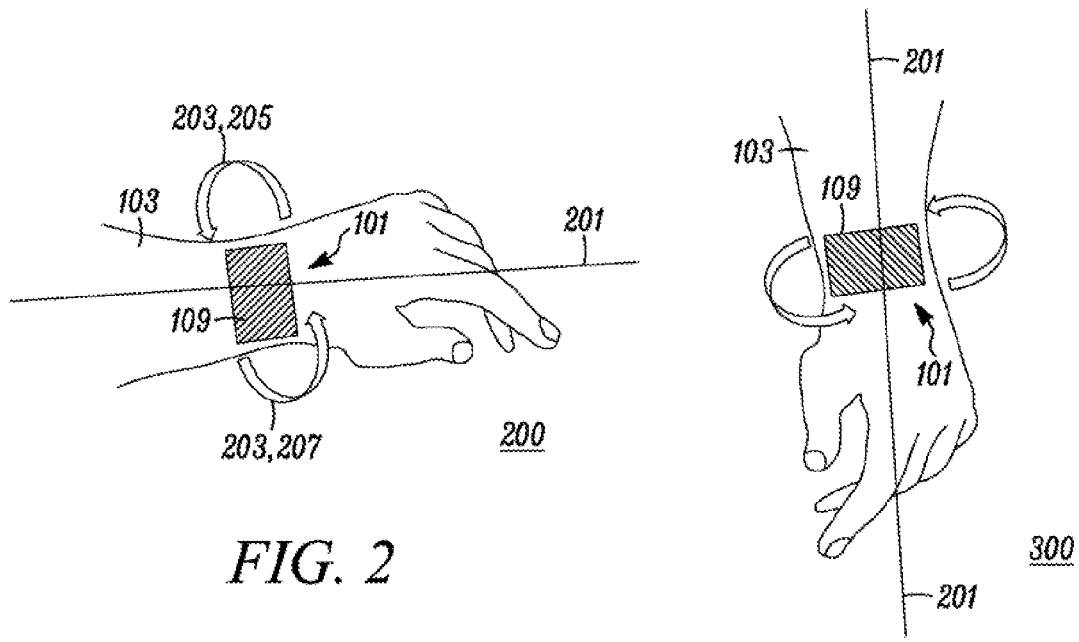
FIG. 2
FIG. 3

PORTABLE ELECTRONIC DEVICE AND METHOD FOR CONTROLLING OPERATION THEREOF BASED ON USER MOTION

FIELD OF THE INVENTION

The present invention relates generally to portable electronic devices and, more particularly, to a portable electronic device capable of controlling one or more of its functions based on user motion.

BACKGROUND

Portable electronic devices are ubiquitous in today's society. Such devices include, for example, cell phones, smart phones, wearable devices, portable media players, tablet computers, personal digital assistants, handheld gaming devices, handheld global positioning satellite (GPS) units, image and/or video cameras, and media devices, just to name a few. A portable electronic device is generally configured such that visual or audible information output by the device is presented uniformly across a display screen or from output speakers under an assumption that, in most cases, the user will generally center the device in his or her field of view/hearing when using it. Additionally, the keys and buttons of portable electronic devices are typically configured with default functions, although some devices allow users to manually change button or key functions by proceeding through a series of operations available to the users through electronic menus.

Many portable electronic devices, including wearable devices, require two-handed operations to activate a function. One hand is used to support the device, whether grasped in an open hand or secured to the user's wrist, and the other hand selects a button or contacts a touch screen of the device to activate the function. Other portable electronic devices include accelerometers to recognize certain gestures, but the accelerometers are activated only after a button is pressed. Operations requiring two hands are particularly detrimental to people with active lifestyles in which both hands are not always conveniently available. As a result, users may refrain from experiencing all the benefits of the portable electronic device.

BRIEF DESCRIPTION OF THE DRAWINGS

FIG. 1 illustrates an example portable electronic device supported by a user's limb in accordance with the present invention.

FIG. 2 illustrates an example portable electronic device rotating about a substantially horizontal axis in accordance with the present invention.

FIG. 3 illustrates an example portable electronic device rotating about a substantially vertical axis in accordance with the present invention.

Figure 4:
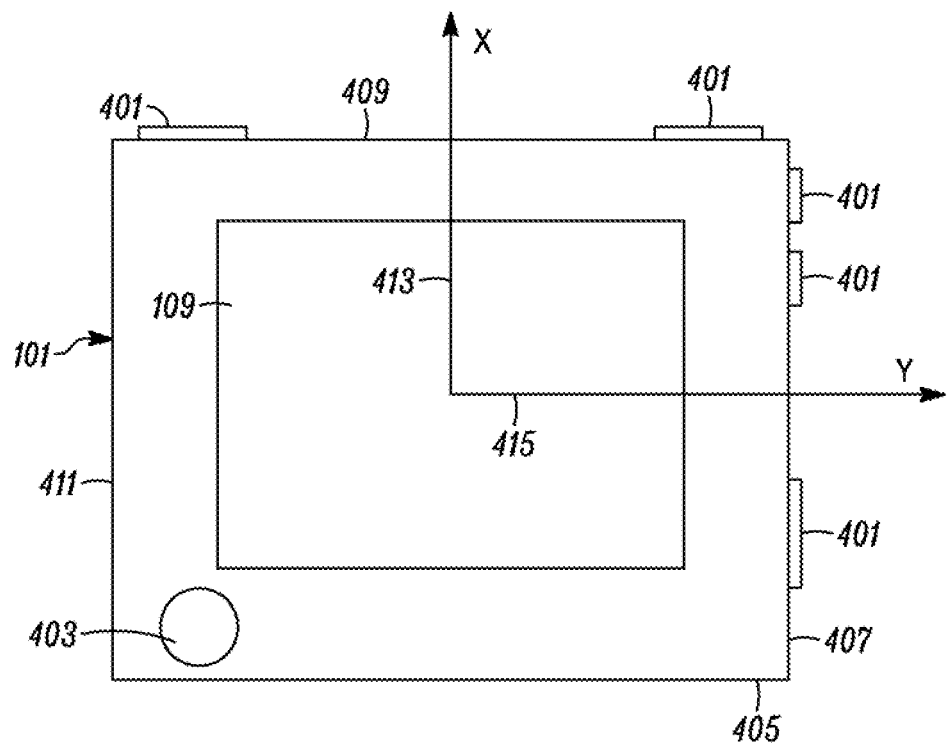
FIG. 4 is a top planar view of an example portable electronic device in accordance with the present invention.

Skilled artisans will appreciate that elements in the figures are illustrated for simplicity and clarity and have not necessarily been drawn to scale. For example, the dimensions of some of the elements in the figures may be exaggerated alone or relative to other elements to help improve the understanding of the various example embodiments of the present invention.

DETAILED DESCRIPTION

Generally, there is described a portable electronic device and a method for controlling one or more devices functions based on user motion. The portable electronic device may be any portable device that is sized and shaped to be possessed by (e.g., carried by or secured to) a user's limb. Portable electronic devices include, but are not limited to, cell phones, smart phones, portable media players, tablet computers, personal digital assistants, handheld gaming devices, cameras, camcorders, handheld GPS units, and wearable or handheld health monitoring devices.

The portable electronic device controls one or more functions based on a one-handed operation of the device. For example, a display and/or its backlighting of the portable electronic device may be activated by motion detected by a motion detector of the device and associating the motion to a predefined gesture. For one embodiment, the portable electronic device may be worn on the wrist of a user, like a watch. For this embodiment, the user may wiggle the portable electronic device and, then, raise the user's arm to view at a face of the watch. This series of gestures can be used to turn-on or activate the display of the device, so that the user may view the display of the device. Thus, for this embodiment, multiple gestures are detected in sequence within a predetermined time period. The first gesture is detected as an alternating signature motion, such as a shake or wiggle, by detecting accelerations at X, Y and/or Z axes. The second gesture following the first gesture is detected to indicate that the display of the device is positioned at an angle so that it may be comfortably viewed by the user. When these gestures are detected in sequence within a particular time period, then the display is activated.

One aspect is a method for controlling operation of a portable electronic device positioned adjacent to a limb of a user. A motion sensor of the portable electronic device detects an alternating signature motion of a limb of the user about a virtual axis corresponding to the limb. The portable electronic device controls at least one function based on the detected alternating signature motion of the limb.

Another aspect a method for controlling operation of a portable electronic device that includes an accelerometer capable of detecting three dimensional acceleration. The accelerometer detects acceleration along X, Y and/or Z axes, in which acceleration peaks of the X and Z axes alternate with each other. The acceleration of the Y axis may remain substantially steady relative to the X and Y axes. The portable electronic device controls at least one function based on the detected acceleration along the X, Y and/or Z axes.

Yet another aspect is a portable electronic device positioned adjacent to a limb of a user comprising a motion sensor and a controller. The motion sensor is configured to detect an alternating signature motion of the limb of the user about a virtual axis corresponding to the limb. The controller is configured to control at least one function based on the detected alternating signature motion of the limb.

Referring to FIG. 1, there is shown an example portable electronic device 101 positioned on a limb 103 of a user 105. For the embodiment shown in FIG. 1, the portable electronic device 101 has a wrist watch form factor that surrounds the periphery of the user's wrist. As noted above, the portable electronic device 101 may have one of a variety of form factors, and it is not restricted to the one shown in FIG. 1. The portable electronic device 101 may include a top planar portion that includes an output device, such as a display. As shown in FIG. 1, the limb 103 of the user 105 may be positioned so that the display 109 of the portable electronic device 101 may be directed towards the user's face, or more particularly the user's eyes, so that the display is within the view angle of the user.

Referring to FIGS. 2 and 3, there is illustrated certain embodiments of the portable electronic device 101 in which the signature motion may be, for example, a rotation about a virtual axis 201 corresponding to the limb. In particular, the portable electronic device 101 may be rotated in an alternating rotations motion 203. For example, the alternating rotations motion 203 of the limb 103 may include two or more sets of rotations within a predetermined time period. Each set of rotations may include rotating in a first direction 205, such as a clockwise direction, about the virtual axis 201 and rotating in a second direction 207, such as a counter-clockwise direction, opposite the first direction about the virtual axis. As shown, the portable electronic device 101 may be positioned peripherally about the virtual axis 201 corresponding to the limb 103 before detecting the alternating rotations motion 203 of the limb 103. The alternating rotations motion 203 may be performed at a variety of angles of the limb 103, such as the horizontal orientation 200 of the limb shown in FIG. 2 and the vertical orientation 300 of the limb shown in FIG. 3. Although rotations are illustrated by FIGS. 2 and 3, the alternating signature motion 203 includes other types of alternating motions, such as linear motions or shaking motions.

It should be noted that the motion sensor may detect a display positioning motion subsequent to the alternating rotations motion 203. The display positioning motion is associated with directing the display 109 of the portable electronic device 101 towards a view angle of the user as shown in FIG. 1. Thus, after detecting the alternating signature motion 203, the device may monitor for the angle positioning of the device and/or it's display relative to a reference, such as gravity.

Referring to FIG. 4, there is shown a top planar view of the example portable electronic device 101 of FIG. 1. As stated above, the portable electronic device 101 may include one or more output components, such as a display 109 and/or a speaker. Also, the portable electronic device 101 may include one or more input components, such as mechanical buttons 401 and/or electrical-based buttons 403. The display 109 is shown at a top surface of the portable electronic device 101, and the device may also include side surfaces, such lower side surface 405, right side surface 407, upper side surface 409 and left side surface 411, which are orthogonal to the top surface.

It is to be noted that the orientation of the portable electronic device 101 shown in FIG. 4 is similar to the orientation of the device on a limb 103 of a user 101 as shown in FIG. 2. FIG. 4 shows the portable electronic device 101 having an X axis 413 directed through the lower and upper side surfaces 405, 409, and a Y axis 415 directed through the right and left side surfaces 407, 411. As stated above, the orientation of the device in FIG. 4 is similar to the orientation of the device in FIG. 2, so the Y axis shown in FIG. 4 is substantially parallel to the virtual axis 201 shown in FIG. 2, and the X axis is substantially orthogonal to the virtual axis of FIGS. 2 and 3.

Figure 5:
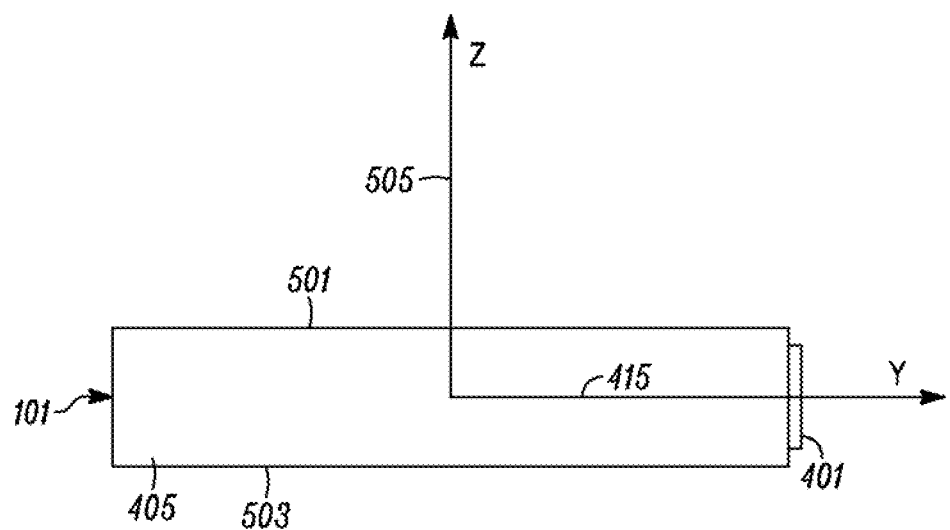
FIG. 5 is a side planar view of the example portable electronic device in accordance with the example embodiment of FIG. 4.

Referring to FIG. 5, there is shown a side planar view of the example portable electronic device 101 of FIG. 1. FIG. 5 represents what would be seen if the device is viewed from the lower side surface of FIG. 4. The portable electronic device 101 has a top surface 501 and a bottom surface 503 that is opposite the top surface. When the portable electronic device 101 positioned adjacent to a limb 103 of the user 105, the bottom surface 503 would be located adjacent to the user's wrist. The portable electronic device 100 has a Z axis 505 that is directed through the top and bottom surfaces 501, 503, and is substantially orthogonal to the virtual axis 201 of FIGS. 2 and 3.

Figure 6:
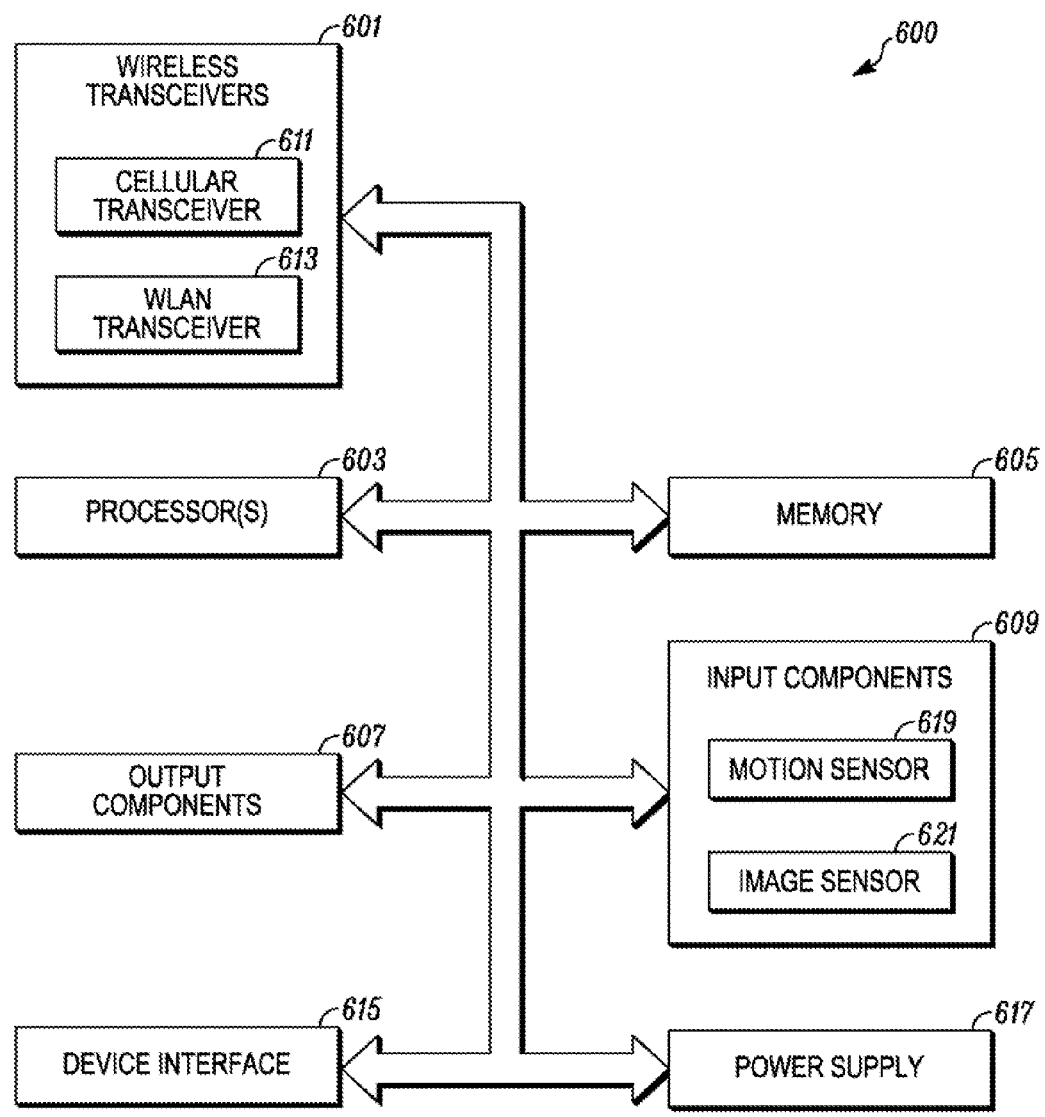
FIG. 6 is a block diagram of examples components of an example portable electronic device in accordance with the present invention.

There is shown in FIG. 6 a block diagram representing example components 600 that may be used for an embodiment in accordance with the present invention. According to one embodiment, the portable electronic device includes a processor and a detection mechanism, such as a motion sensor. The detection mechanism detects one or more characteristics relating to how a user handles the device. For example, the detection mechanism may detect a direction, angle, rotation, and/or orientation of movement of the device relative to a reference position prior to, during, and/or after use of the device, and/or may detect an environment surrounding the device prior to, during, and/or after its use. Therefore, the detection mechanism may include one or more motion sensors such as, for example, a camera, an accelerometer, a gyroscope, and/or a proximity detector (such as an optical sensor and/or an ultrasonic sensor). The user-handling characteristics may be detected over a period of time and stored in memory to provide historical information regarding the user's handling of the electronic device.

Referring to FIG. 6, the example embodiment may include one or more wireless transceivers 601, one or more processors 603, one or more memories 605, one or more output components 607, and one or more input components 609. Each embodiment may include a user interface that comprises one or more output components 607 and/or one or more input components 609. Each wireless transceiver 601 may utilize wireless technology for communication, such as, but not limited to, cellular-based communications such as analog communications (using AMPS), digital communications (using CDMA, TDMA, GSM, iDEN, GPRS, or EDGE), and next generation communications (using UMTS, WCDMA, LTE, LTE-A or IEEE 802.16) and their variants, as represented by cellular transceiver 611. Each wireless transceiver 601 may also utilize wireless technology for communication, such as, but are not limited to, peer-to-peer or ad hoc communications such as HomeRF, Bluetooth and IEEE 802.11 (a, b, g or n), wireless HDMI; wireless USB, and other forms of wireless communication such as infrared technology, as represented by WLAN transceiver 613. Also, each transceiver 601 may be a receiver, a transmitter or both.

The processor 603 operates in accordance with stored operating instructions to, among other things, determine at least one function of the device based on user motion. For example, the processor may control a transition from a sleep mode to a wake mode of the device and/or its output component(s), a direction of audio outputted by the device (e.g., speaker steering), a direction from which audio is received by the device (e.g., microphone steering), arrangement of information and images displayed on a display of the device, user interface configuration for the device (e.g., button function assignment), and various other functions of the device taking into account which limb of the user possesses the device.

The processor 603 may generate commands based on information received from one or more input components 609. The processor 603 may process the received information alone or in combination with other data, such as the information stored in the memory 605. Thus, the memory 605 of the internal components 600 may be used by the processor 603 to store and retrieve data. The data that may be stored by the memory 605 includes, but not limited to, operating systems, applications, and data. Each operating system includes executable code that controls basic functions of the portable electronic device 100, such as interaction among the components of the internal components 600, communication with external devices via each transceiver 601 and/or the device interface (see below), and storage and retrieval of applications and data to and from the memory 605. Each application includes executable code utilizing an operating system to provide more specific functionality for the portable electronic device. Data is non-executable code or information that may be referenced and/or manipulated by an operating system or application for performing functions of the portable electronic device 100.

The input components 609, such as a motion sensor, an image sensor, a touch sensitive surface of a display, or other components of the user interface, may produce an input signal in response to a user input. For example, the device 100 may include one or more motion sensors, such as an accelerometer or compass. For another example, the device 100 may include one or more image sensors, such as a camera, a charge-coupled device, complementary metal-oxide semiconductor sensors, video sensors, light sensor, IR or near-IR sensors, thermo sensors, multi-spectral sensors, gamma sensors, x-ray sensors, or the like. In addition, the input components 609 may include an audio input component such as a microphone, or another type of mechanical input component or activator such as button or key selection sensors or switch.

Likewise, the output components 607 of the internal components 600 may include one or more video, audio and/or mechanical outputs. For example, the output components 607 may include the visible display, such as the display 107. Other output components 607 may include a video output component such as a touch screen, a cathode ray tube, liquid crystal display, plasma display, incandescent light, fluorescent light, front or rear projection display, and light emitting diode indicator. Other examples of output components 607 include an audio output component such as a speaker, alarm and/or buzzer, and/or a mechanical output component such as vibrating or motion-based mechanisms.

The internal components 600 may further include a device interface 615 to provide a direct connection to auxiliary components or accessories for additional or enhanced functionality. In addition, the internal components 600 preferably include a power source 617, such as a portable battery, for providing power to the other internal components and allow portability of the portable electronic device 100.

It is to be understood that FIG. 6 is provided for illustrative purposes only and for illustrating components of a portable electronic device 100 in accordance with the present invention, and is not intended to be a complete schematic diagram of the various components required for a portable electronic device. Therefore, a portable electronic device may include various other components not shown in FIG. 6, or may include a combination of two or more components or a division of a particular component into two or more separate components, and still be within the scope of the present invention.

Figure 7:
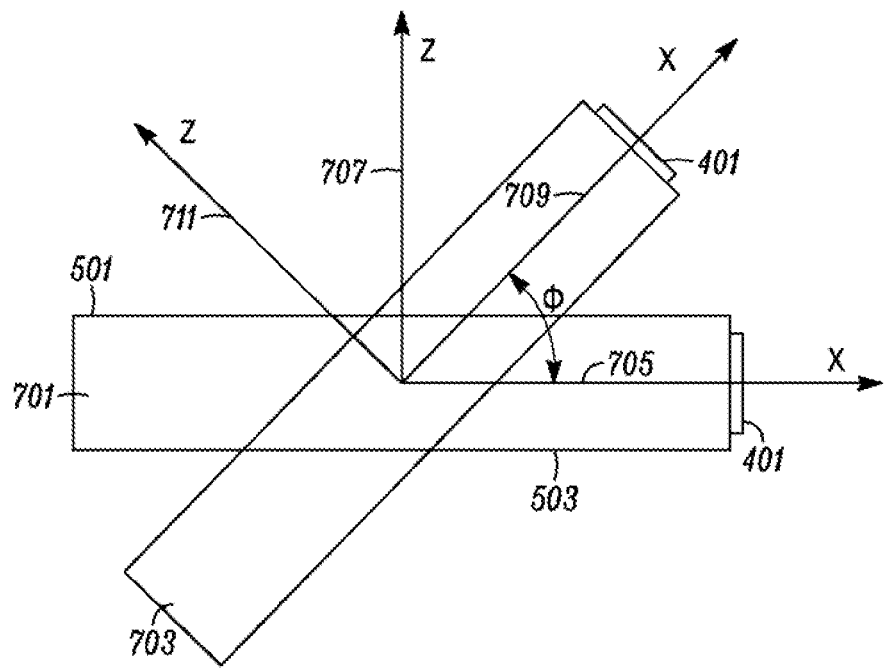
FIG. 7 is another side planar view of the example portable electronic device in accordance with the example embodiment of FIG. 4 and substantially orthogonal to the view of FIG. 5.

Referring to FIG. 7, there is shown another planar side view of the portable electronic device 101 of FIG. 1. In contrast to FIG. 5, which represents a view from the lower side surface of FIG. 4, FIG. 7 represents a view from the right side surface 407 of FIG. 4. FIG. 7 represents the display positioning motion as associated with directing a display of the portable electronic device towards a view angle of the user. In particular, FIG. 7 illustrates the rotation of the portable electronic device 101 about the virtual axis 201, by representing two example orientations for the motion, namely a first orientation 701 and a second orientation. The first orientation 701 has a first X axis 705 and a second Z axis 707, and the second orientation 703 has a second X axis 709 and a second Z axis 711. Thus, the X and Z axes, as well as the Y axis, is relative to the orientation of the portable electronic device 101. Thus, when a user 105 views the display 109 of the portable electronic device 101, the display may be directed straight upward in which the Z axis may be directed substantially upward and the X axis is directed substantially sideways as represented by the first orientation 701, the display may be directed straight sideways in which the X axis may be directed substantially upward and the Z axis may be directed substantially sideways as represented by the first orientation 701, and the display may be directed at an angle in which the X axis and the Z axis may be partially directed upward as represented by the second orientation 703. It is to be understood that the display may be directed an a wide range of angles towards the user's view angle and is not restricted to the angles represented by FIG. 7.

Figure 8:
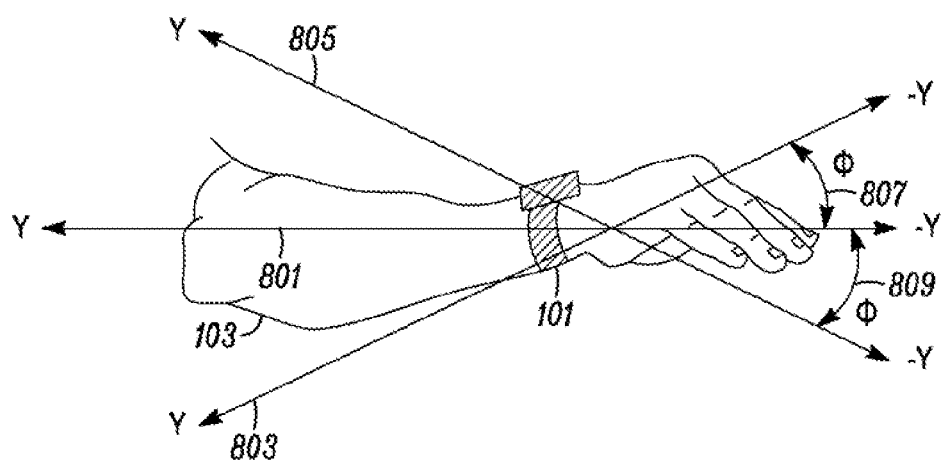
FIG. 8 is a side planar view of the example portable electronic device positioned on a limb of a user in accordance with the present invention.

Referring first to FIG. 8, there is shown a view similar to FIG. 1 in which only the portable electronic device 101 with the limb 103 of the user 105 is shown. FIG. 8, in conjunction with FIG. 7, illustrates the operation of the portable electronic device 101, in which an accelerometer of the device capable of detecting three dimensional acceleration. The accelerometer detects acceleration along X, Y and/or Z axes. When performing the alternating signature motion 203 of the limb 103 of the user 101, there is a significant change in the angles of the X and Z axes, and there is minimal change in the angle of Y axis 801. When performing the display positioning motion, the change in the angles of the X and Z axes may vary and, again, there is minimal change in the angle of the Y axis 801. However, in the process of moving the limb 103 during the display positioning motion, it is possible for the Y axis tilt upward 803 or downward 805, thus changing the corresponding angles of the Y axis 807, 809. Although the angles of the Y axis 807, 809 may vary, these angles may be as much as 23 degrees in either direction, for a total range of angular movement of about 46 degrees.

Figure 9:
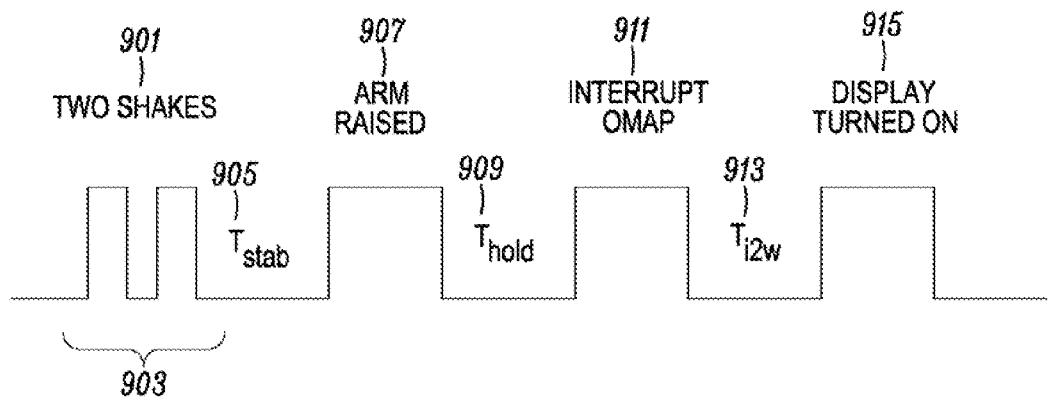
FIG. 9 is a timing diagram representing an example operation of the device in accordance with the present invention.

Referring to FIG. 9, there is shown a graphical illustration of the operation of the alternating signature motion 203, the display positioning motion, and controlling one or more functions based on one or both of these motions. The motion sensor of the portable electronic device detects an alternating signature motion of a limb of the user about a virtual axis corresponding to the limb at step 901. In particular, the alternating signature motion of the limb includes two or more sets of signature motions within a predetermined time period 903. For some embodiments, the predetermined time period may be between 1 to 2 seconds, such as 1.2 seconds. For example, the sets of signature motions may be signal peaks corresponding to multiple shakes of the device. For some embodiments, if more that two sets of signature motions are detected, the last two signature motions are analyzed. For other embodiments, all motions may be analyzed. Next, the motion sensor identifies a stabilization time $T_{stab}$ 905 to establish the end of the alternating signature motion. The motion sensor then detects the display positioning motion at step 907. An example of the display positioning motion is raising the limb 103 and/or tilting the display 109 to the viewing angle of the user 105. Next, the motion sensor identifies a hold time $T_{hold}$ 909 to establish the end of the display positioning motion. After identifying the alternating signature motion and the display positioning motion, the device 101 may control one or more functions based on one or both of these motions. For example, the device 101 may send an interrupt signal to the processor 203 at step 911, the processor 203 may send an output signal during a bus transmission time $T_{i2w}$ at step 913, and the display 109 may be activated in response to the output signal at step 915. Thus, activation of a device function may be in response to detecting multiple peaks of acceleration exceeding a predetermined threshold level followed by angular position of the device within a predetermined range of viewing angles.

Figure 10:
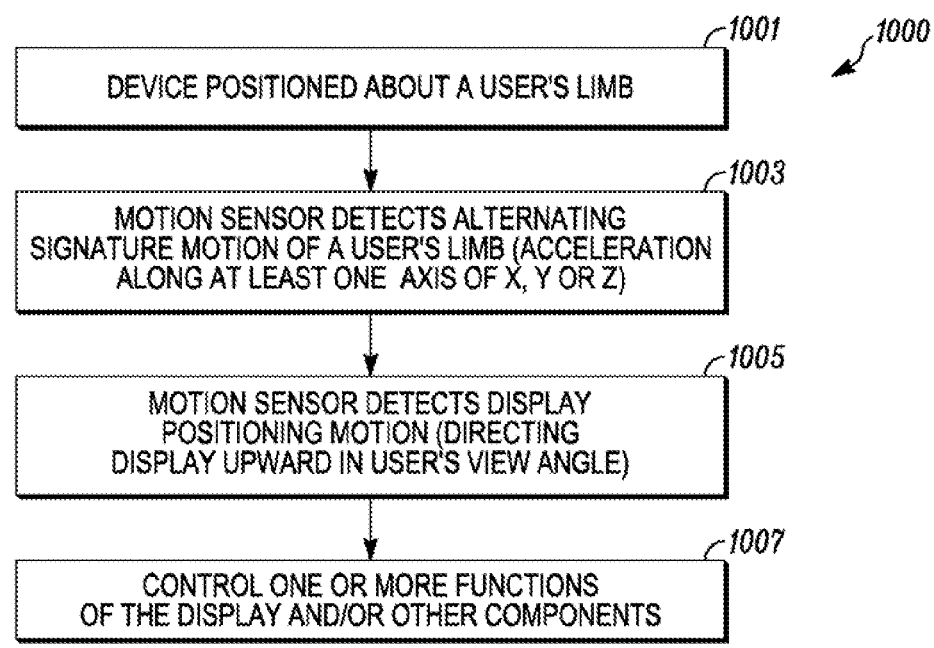
FIG. 10 is a logic flow diagram of steps executable by a portable electronic device to control an operation of the device in accordance with the present invention.

Referring to FIG. 10, there is shown a logic flow diagram of steps executable by a portable electronic device to control an operation 1000 of the device in accordance with the present invention. The portable electronic device is positioned peripherally about a virtual axis corresponding to the limb at step 1001. The motion sensor of the portable electronic device then detects an alternating signature motion of the limb of the user about the virtual axis corresponding to the limb at step 1003. The alternating signature motion may be detected by, for example, an accelerometer based on accelerations along the X, Y and/or Z axes. Also, the alternating signature motion of the limb may include two or more sets of signature motions within a predetermined time period. Each set of signature motions may include rotating in a first direction about the virtual axis and rotating in a second direction opposite the first direction about the virtual axis. Next, the motion sensor may detect a display positioning motion subsequent to the alternating signature motion, in which the display positioning motion is associated with directing a display of the portable electronic device towards a view angle of the user, at step 1005. Finally, the portable electronic device, such as the processor 603 and/or motion sensor 619, may control one or more functions based on the detected alternating signature motion of the limb and/or display positioning motion. For one embodiment, the function or functions of a display of the portable electronic device may be controlled. For another embodiment, the function or functions of transitioning the display of the portable electronic device from an inactive mode to an active mode may be controlled.

Figure 11:
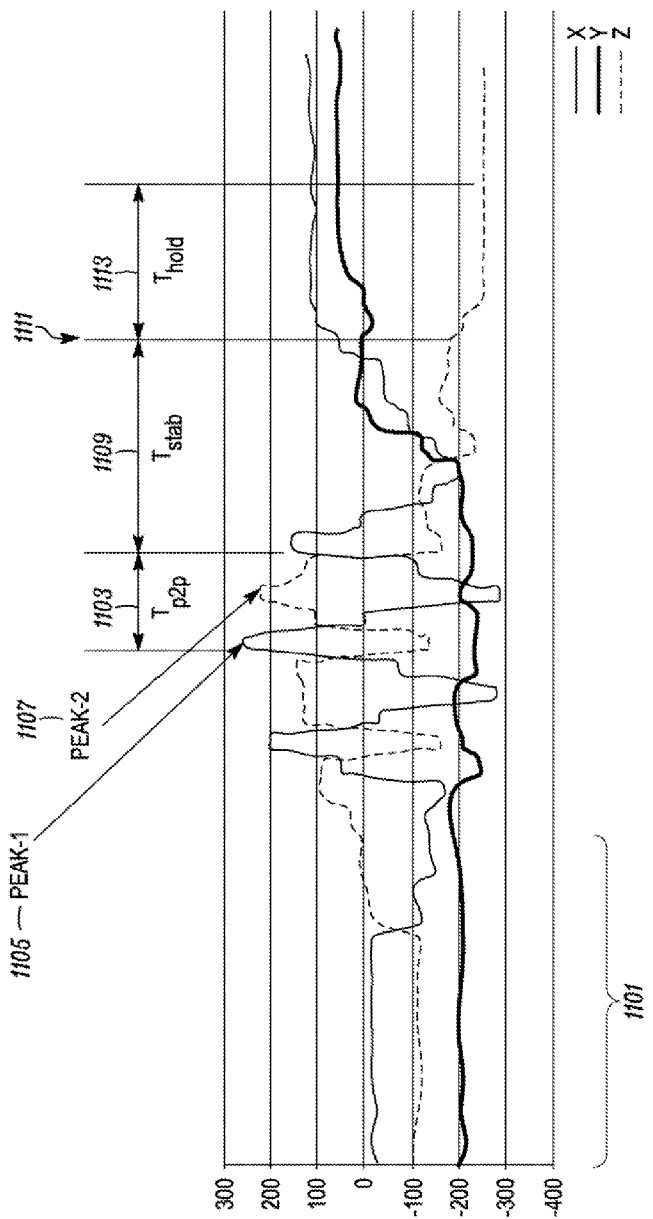
FIG. 11 illustrates an example output voltage data of a motion sensor over time for three axes when a portable electronic device incorporating the sensor is moved while a user is standing, in accordance the present invention.

Referring to FIG. 11, there is shown an example output voltage data of a motion sensor over time for three axes when a portable electronic device incorporating the sensor is moved while a user is standing, in accordance the present invention. Similar to FIG. 9, FIG. 11 illustrates the operation of the alternating signature motion and the display positioning motion. Optionally, the accelerations detected at the X, Y and/or Z axes of the motion detector may indicate a steady state for all three, as represented by time 1101. The motion sensor of the portable electronic device may then detect an alternating signature motion of a limb of the user about a virtual axis corresponding to the limb at time 1103. In particular, the alternating signature motion of the limb includes two or more sets of signature motions within a predetermined time period, as represented by the first peak 1105 and the second peak 1107. For example, the predetermined time period may be a peak-to-peak time $T_{p2p}$ having a maximum of 800 ms. It should be noted that the motion sensor may be an accelerometer, and the accelerometer may detect acceleration along X, Y and/or Z axes, in which acceleration peaks of the X and Z axes alternate with each other and acceleration of the Y axis remains substantially steady relative to the X and Y axes. For one embodiment, the acceleration may detect that the acceleration peaks of the X and Z axes alternate with each other at least twice within a predetermined time period.

Next, the motion sensor may identify a stabilization time $T_{stab}$ 1109 to establish the end of the alternating signature motion. For example, the stabilization time $T_{stab}$ 1109 may be about 120 ms. The motion sensor may then detect the display positioning motion at time 1111. As stated above, an example of the display positioning motion is raising the limb 103 and/or tilting the display 109 to the viewing angle of the user 105. For one embodiment, the accelerometer may detect acceleration along the Z axis indicating that a display of the portable electronic device is directed at least, in part, upward in direction. Next, the motion sensor may identify a hold time $T_{hold}$ 1113 to establish the end of the display positioning motion. For example, the hold time $T_{hold}$ 1113 may be about 120 ms. After identifying the alternating signature motion and the display positioning motion, the device 101 may control one or more functions based on one or both of these motions, i.e., the detected acceleration along the X, Y and/or Z axes. Thus, activation of a device function or functions may be in response to detecting multiple peaks of acceleration exceeding a predetermined threshold level followed by angular position of the device within a predetermined range of viewing angles.

Figure 12:
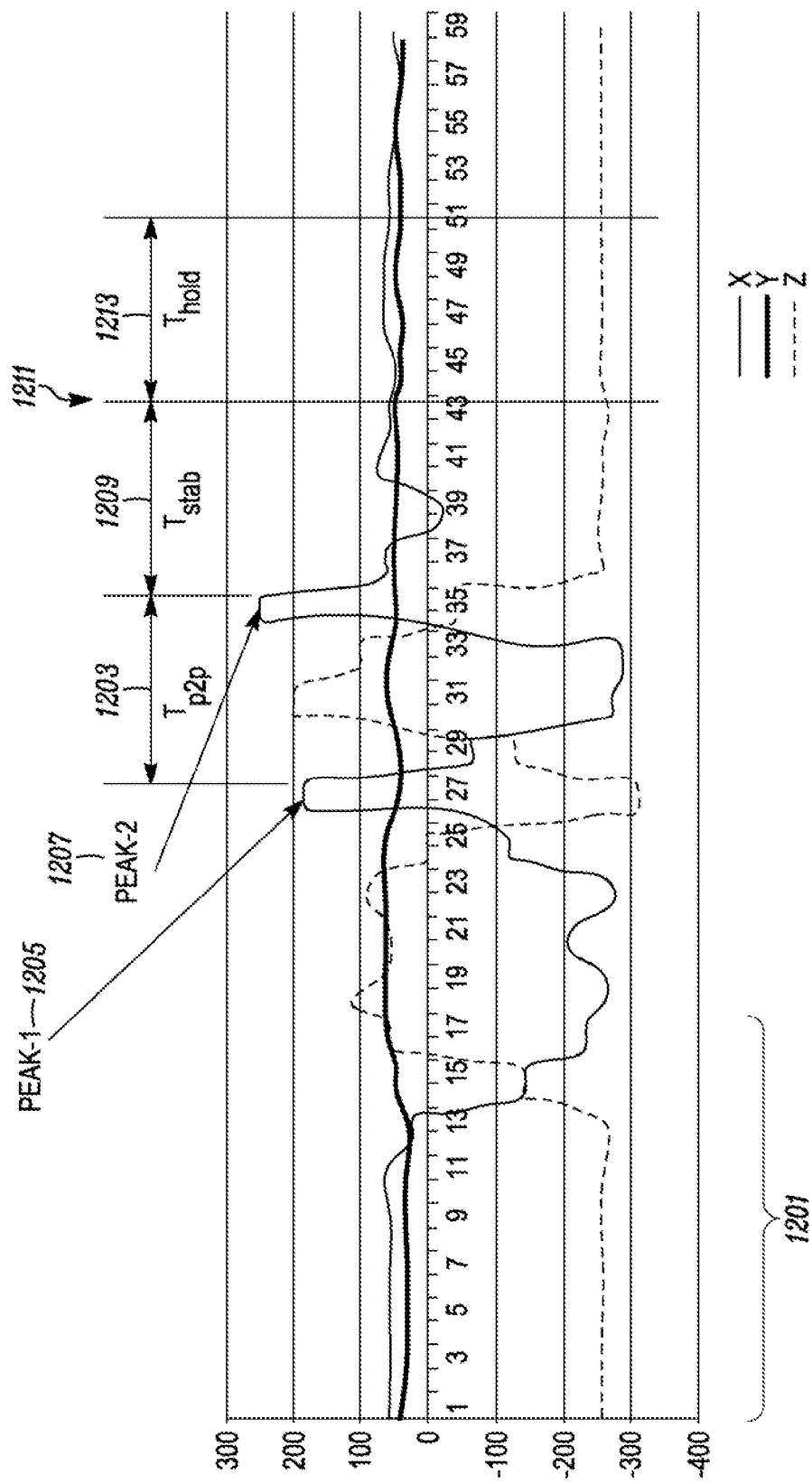
FIG. 12 illustrates an example output voltage data of a motion sensor over time for three axes when a portable electronic device incorporating the sensor is moved while a user is sitting, in accordance with the present invention.

Referring to FIG. 12, there is shown an example output voltage data of a motion sensor over time for three axes when a portable electronic device incorporating the sensor is moved while a user is sitting, in accordance with the present invention. FIG. 12 is substantially similar to FIG. 11, except that the user's body is more stable and, thus, this extra stability is reflected by the acceleration measurements of the motion sensor. Again, the accelerations detected at the X, Y and/or Z axes of the motion detector may or may not indicate a steady state for all three, as represented by time 1201. The motion sensor of the portable electronic device may then detect an alternating signature motion of a limb of the user about a virtual axis corresponding to the limb at time 1203. The alternating signature motion of the limb includes two or more sets of signature motions within a predetermined time period, such as peak-to-peak time $T_{p2p}$, as represented by the first peak 1205 and the second peak 1207. Next, the motion sensor may identify a stabilization time $T_{stab}$ 1209 to establish the end of the alternating signature motion. The motion sensor may then detect the display positioning motion at time 1211. Next, the motion sensor may identify a hold time $T_{hold}$ 1213 to establish the end of the display positioning motion. After identifying the alternating signature motion and the display positioning motion, the device 101 may control one or more functions based on one or both of these motions, i.e., the detected acceleration along the X, Y and/or Z axes.

As detailed above, embodiments of the present invention reside primarily in combinations of method steps and/or apparatus components related to controlling operation of a portable electronic device based on motion of a user wearing the electronic device. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as "first" and "second," "top" and "bottom," and the like may be used solely to distinguish one entity or action from another entity or action without necessarily requiring or implying any actual relationship or order between such entities or actions. The terms "comprises," "comprising," "includes," "including," "has," "having," "contains," "containing," and any other variations thereof are intended to cover a non-exclusive inclusion, such that a process, method, article, or apparatus that comprises, includes, has, or contains a list of elements does not include only those elements but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the portable electronic device 101, 500 described herein may be comprised of one or more conventional processors and unique stored program instructions that control the processor(s) to implement, in conjunction with certain non-processor circuits, some, most, or all of the functions of the portable electronic device 101, 500 and its operational methods as described herein. The non-processor circuits may include, but are not limited to, storage devices (such as the internal memory 503), the user handling detection mechanism 505, the audio input device 507, the display 509, the user interface 511, the audio output device 513, and the transceiver 515 described above, as well as filters, clock circuits, and various other non-processor circuits. As such, the functions of these non-processor circuits may be interpreted as steps of a method for controlling operation of a portable electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the various approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and integrated circuits without undue experimentation.

In the foregoing specification, specific embodiments of the present invention have been described. However, one of ordinary skill in the art will appreciate that various modifications and changes can be made without departing from the scope of the present invention as set forth in the appended claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A method for controlling operation of a portable electronic device, the method comprising:
   detecting, by a motion sensor of the portable electronic device, an alternating signature motion of the portable electronic device about a virtual axis;
   detecting, by the motion sensor, a stabilization time to establish an end of the alternating signature motion;
   subsequent to and within a predetermined time period from detecting the end of the alternating signature motion, detecting, by the motion sensor, a display positioning motion, wherein the display positioning motion is associated with directing a display of the portable electronic device towards a view angle of the user; and
   controlling, by the portable electronic device, at least one function based on the alternating signature motion and the display positioning motion.

2. The method of claim 1, further comprising, prior to detecting the alternating signature motion of the portable electronic device, positioning the portable electronic device peripherally about the virtual axis.

3. The method of claim 1, wherein:
   the predetermined time period comprises a first predetermined time period;
   the alternating signature motion of the portable electronic device includes at least two sets of alternating signature motions within a second predetermined time period; and
   each set of the at least two sets of alternating signature motions includes rotating in a first direction about the virtual axis and rotating in a second direction opposite the first direction about the virtual axis.

4. The method of claim 1, wherein controlling the at least one function includes controlling the at least one function of a display of the portable electronic device.

5. The method of claim 1, wherein controlling the at least one function includes transitioning a display of the portable electronic device from an inactive mode to an active mode.

6. A method for controlling operation of a portable electronic device, the portable electronic device including an accelerometer capable of detecting three dimensional acceleration, the method comprising:
   detecting, by the accelerometer, acceleration along at least one axis of X, Y and Z axes, wherein acceleration peaks of the X and Z axes alternate with each other;
   detecting, by the accelerometer, a stabilization time to establish an end of the acceleration along at least one axis of X, Y and Z axes;
   subsequent to and within a predetermined time period from detecting the end of the acceleration along the at least one axis of X, Y and Z axes, detecting, by the accelerometer, acceleration along the Z axis indicating that a display of the portable electronic device is directed at least, in part, upward in direction; and
   controlling, by the portable electronic device, at least one function based on the acceleration along the at least one axis of the X, Y and Z axes and the acceleration along the Z axis.

7. The method of claim 6, further comprising, prior to detecting acceleration along at least one axis of X, Y and Z axes, positioning the portable electronic device peripherally about a virtual axis substantially parallel to the Y axis and substantially orthogonal to the X and Z axes.

8. The method of claim 6, wherein the predetermined time period comprises a first predetermined time period, and wherein detecting acceleration along at least one axis of X, Y, and Z axes comprises detecting that the acceleration peaks of the X and Z axes alternate with each other at least twice within a second predetermined time period.

9. The method of claim 6, wherein controlling the at least one function includes controlling the at least one function of a display of the portable electronic device.

10. The method of claim 6, wherein controlling the at least one function includes transitioning a display of the portable electronic device from an inactive mode to an active mode.

11. A portable electronic device comprising:
   a motion sensor configured to detect:
      an alternating signature motion of the portable electronic device about a virtual axis;
      a stabilization time to establish an end of the alternating signature motion; and
      subsequent to and within a predetermined time period from detecting the end of the alternating signature motion, a display positioning motion, wherein the display positioning motion is associated with directing a display of the portable electronic device towards a view angle of the user; and
   a controller configured to:
      control at least one function based on the alternating signature motion and the display positioning motion.

12. The portable electronic device of claim 11, wherein:
the motion sensor detects the alternating signature motion as acceleration along at least one axis of X, Y and Z axes, wherein acceleration peaks of the X and Z axes alternate with each other and acceleration of the Y axis remains substantially steady relative to the X and Y axes.

13. The portable electronic device of claim 11, wherein:
the predetermined time period comprises a first predetermined time period;
the alternating signature motion includes at least two sets of signature motions within a second predetermined time period; and
each set of signature motions includes rotating in a first direction about the virtual axis and rotating in a second direction opposite the first direction about the virtual axis.

14. The portable electronic device of claim 11, wherein the at least one function includes at least one function of a display of the portable electronic device.

15. The portable electronic device of claim 11, wherein the controller is configured to transition a display of the portable electronic device from an inactive mode to an active mode.

* * * * *